United States Patent
Brunet et al.

(10) Patent No.: US 6,847,996 B2
(45) Date of Patent: Jan. 25, 2005

(54) METHOD FOR MANAGING AN OPEN COMPUTER SYSTEM

(75) Inventors: Jean Brunet, Betton (FR); Xiaobo Li, Puteaux (FR); Florence Lamberet, Saint Jacques de la Lande (FR)

(73) Assignee: Bull, S.A., Louveciennes (FR)

( * ) Notice: Subject to any disclaimer, the term of this patent is extended or adjusted under 35 U.S.C. 154(b) by 852 days.

(21) Appl. No.: 09/750,285

(22) Filed: Dec. 29, 2000

(65) Prior Publication Data

US 2001/0026536 A1 Oct. 4, 2001

(30) Foreign Application Priority Data

Dec. 31, 1999 (FR) ............................................. 99 16875

(51) Int. Cl.$^7$ ........................ G06F 15/16; G06F 15/177
(52) U.S. Cl. ........................ 709/223; 709/220; 709/228
(58) Field of Search .............................. 709/201, 217, 709/223, 224, 225, 226, 227, 228, 230, 220

(56) References Cited

U.S. PATENT DOCUMENTS

| | | | |
|---|---|---|---|
| 5,185,860 A | * 2/1993 | Wu | 709/224 |
| 5,568,471 A | * 10/1996 | Hershey et al. | 370/245 |
| 5,651,006 A | 7/1997 | Fujino et al. | |
| 5,777,549 A | * 7/1998 | Arrowsmith et al. | 709/223 |

OTHER PUBLICATIONS

Siegl M R et al.: "Hierarchical network management: a concept and its prototype in SNMPv2" Computer Networks and ISDN Systems, NL, North Holland Publishing, Amsterdam, vol. 28, No. 4, Feb. 1, 1996 pp. 441–452, XP004002977, ISSN 0169–7552, entire document.

Sethi A S et al.: "A Hierarchical Management Framework for Battlefield Network Management" Annual Military Communications Conference, US, NY NY, IEEE Nov. 3, 1997, pp. 1239–1243, XP000792606, ISBN 0–7803–4203–4250–X entire document.

Stallings W, "SNMP and SNMPV2: The Infrastructure for Network Management" IEEE Communications Magazine, US, IEEE Service Ctr. Piscataway, NY, vol. 36, No. 3, Mar. 1, 1998, pp. 37–43, XP000751844 ISSN: 0163–6804—Entire document.

* cited by examiner

Primary Examiner—Paul H. Kang
(74) Attorney, Agent, or Firm—Miles & Stockbridge P.C.; Edward J. Kondracki (57) ABSTRACT

The present invention relates to a method for calculating an indicator of a network management system comprising at least one submanager that monitors a part of the network. The submanager comprises a plurality of modules that allow communication with the equipment units of the network and with a main manager., At least one equation defining an indicator and evaluated by an indicator module of the submanager comprises at least one object attribute, at least one index whereof is variable. The method comprises a step for the reception by the indicator module of a notification transmitted by a model configuration module, which notification comprises an address of an equipment unit and an identification of an equation representing an indicator. The method further comprises an initialization step in which the instances of the variable indices have an initial value that does not make it possible to calculate the specified equation, and a step for determining all the valid instances of all the variable indices of all the attributes of the equation.

38 Claims, 3 Drawing Sheets

METHOD FOR MANAGING AN OPEN COMPUTER SYSTEM

FIELD OF THE INVENTION

The present invention relates to a method for managing an open computer system.

DESCRIPTION OF RELATED ART

A method for managing a network constituted by a plurality of subnetworks, is disclosed through French patent FR 98 04695 filed in France on Apr. 15, 1998 entitled "Process and System for Network and Systems Management," which corresponds to U.S. Ser. No. 09/292,561 filed on Apr. 15, 1999, in the name of Jean Brunet and Florence Lamberet, and assigned to the assignee of the present invention. The subject matter of said application and the patent to issue therefrom is hereby incorporated by reference. The aforementioned method for managing a network constituted by a plurality of subnetworks uses a submanager called COACH, located in a local area network and communicating with the main manager, to manage a subnetwork. The submanager comprises a plurality of modules that make it possible to communicate with and manage the equipment and the applications of the subnetwork and to communicate with the main manager.

The essential function of one of the modules of the submanager is to calculate indicators. An indicator is an equation into which instances of objects representing the operation of the equipment units in a subnetwork are inserted. According to this document, each instance of an equation must be precisely defined by an attribute whose index or indices are fully known. Thus, this method does not make it possible to handle generic indicator equations in which the instances are not completely defined. Moreover, these equations do not make it possible to automatically handle the addition or deletion of equipment units, and hence, of instances.

The object of the present invention is to eliminate the drawbacks of the prior art by offering a method for calculating an indicator that makes it possible to apply an equation to a set of objects dynamically.

This object is achieved through a method for calculating an indicator of a network management system comprising at least one submanager that monitors a part of the network. The submanager comprises a plurality of modules that allow communication with the equipment units of the network and with a main manager. The calculation method is characterized in that at least one equation defining an indicator and evaluated by an indicator module of the submanager comprises at least one object attribute, at least one index whereof is variable. The method further comprises a step for the reception by the indicator module of a notification transmitted by a model configuration module, this notification comprising an address of an equipment unit and an identification of an equation representing an indicator, an initialization step in which the instances of the variable indices have an initial value that does not make it possible to calculate the specified equation, and In another embodiment, the method comprises:

a step for searching, in the equation, for an attribute called a unifier attribute comprising the largest number of variable indices, a step for sending an interrogation request, successively requesting the next instance of the unifier attribute, a step for extracting the instances of each variable index of the unifier attribute, a step for sending an interrogation request requesting the instances of the attributes of the equation having as variable index values the values extracted in the preceding step, and a step for storing the variable index instances for which an instance has been found for all of the attributes of the equation.

In another embodiment, the definition of the indices in the equation comprises constraints limiting the number of instances possible for at least one variable index.

In yet another embodiment, the method comprises a verification step that makes it possible to verify whether the instances of the extracted indices of the unifier attribute satisfy the specified constraints.

In still another embodiment, the method comprises a step for updating the instances of the indices, performed periodically.

In a further embodiment, the updating step comprises:

a step for sending an interrogation request, successively requesting all the instances of the unifier attribute, a step for comparing the index instances found with the previous index instances, a step for verifying the validity of the index instances found that correspond to previous index instances, and the index instances found that do not correspond to previous index instances, a step for deleting the previous index instances that were not found or that are no longer valid, and a step for adding the index instances found and validated.

In another embodiment, the step for validating the instances comprises a step for sending an interrogation request requesting the instances of the attributes of the equation having as variable index values the instances found in the preceding step.

In another embodiment, the step for deleting the previous index instances that were not found or that are no longer valid comprises:

a step for marking the index instances validated during the validity verification step, a step for counting the total number of index instances, a step for deleting all of the unmarked index instances, except one.

BRIEF DESCRIPTION OF THE DRAWINGS

The invention, with its characteristics and advantages, will become clearer with the reading of the description given in reference to the attached drawings, in which.

DETAILED DESCRIPTION OF THE PREFERRED EMBODIMENTS

Figure 3A:
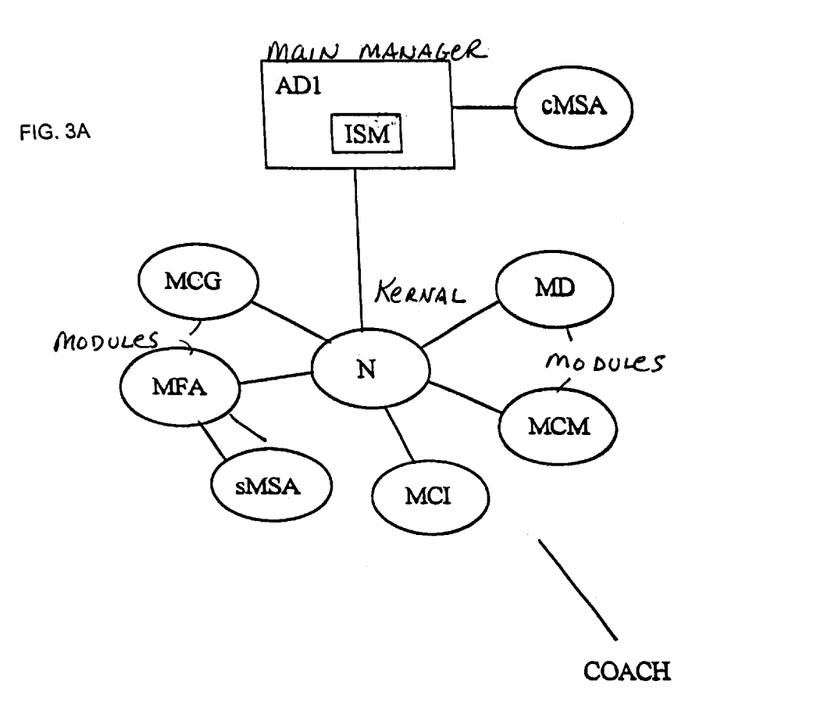
FIGS. 3A and 3B represent an exemplary architecture of a submanager used in the method according to the invention.
Figure 3B:
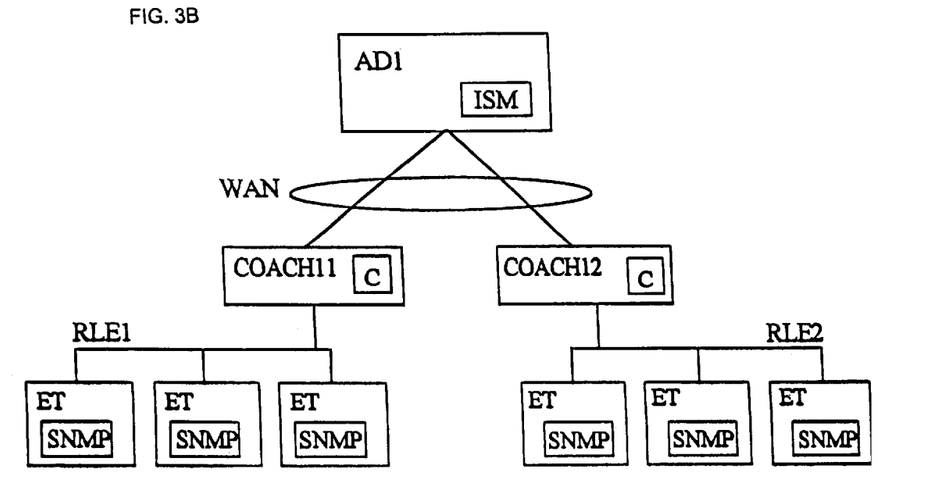

The submanager (COACH) described in the aforenoted French patent FR 98 04695 filed on Apr. 15, 1998 is represented in FIGS. 3A and 3B. This submanager comprises a set of processes, also called "modules" (MCG, MFA, MD, MCM, MCI), which dialogue with one another and with the main manager (AD) through a central process, also called a "kernel" (N). The dialogues between the various module takes place through a standard portable socket. Each module (MCG, MFA, MD, MCM, MCI) is dedicated to a precise function. Only the elements describing the main modules used in the present invention will be described below.

The central module or kernel (N) has two main functions. First, it dialogues with the manager (AD1), and secondly, it manages the dialogue between the various modules composing the submanager (COACH). In essence, the kernel (N) responds with a dialog in the SNMP protocol when the submanager (COACH) is interrogated or configured by the manager. There are two types of dialogue with the modules, which is why two communication sockets are desirable for handling the kernel-module dialogue. The first type of dialogue occurs on the initiative of the kernel and involves updates of instances, or requests for information in a management information base (MIB), or transmissions of notifications coming from another module. The second type of dialogue occurs on the initiative of the modules and involves requests for information or updates of instances of the management information base (MIB). The kernel manages two lists of sockets. The creation of a socket in each of these lists takes place dynamically during the connection of the modules. For the (SNMP) dialogue with the manager, the standard imposes the use of only one socket. The dialogue takes place through the UDP port 161, but the use of a request dispatcher requires the use of another parameterizable port in order to have the capability to run several (SNMP) agents in the same piece of equipment. In order to simplify the management of communication with the modules, a common interface is defined in the form of a library. Furthermore, the kernel (N) has a cache memory containing all of the information resulting from the management of a subnetwork (RLE). Each module (MCG, MFA, MD, MCM, MCI) interrogates the kernel (N) in order to initialize these operating parameters. In addition, the kernel (N) manages a database containing all the instances of the management information base (MIB) in the subnetwork managed by the submanager (COACH).

The search module (MD) searches for the subnetwork (RLE1) in which the submanager (COACH11) is installed. Using a table of the address masks of the Internet Protocol (IP), the search module (MD) determines the addresses (IP) of the equipment units (ET) that the submanager could possibly manage. Next, the search module (MD) successively interrogates, using a single packet internet grouper (PING), all of the possible equipment. A PING is a standard interrogation that can be used to find out whether a machine is connected to the Internet, in order to determine the source of a message or to see if a system is still active. When an equipment unit is visible in the network, it responds to the PING.

If an equipment unit is found, the search module (MD) searches for its domain. Each equipment unit belongs to at least one domain. The domain of each unit makes it possible to define groups of indicators and alarm filters to be inserted in each of the units, as a function of the agents present in these units and hence as a function of the roles assigned to each unit.

An equipment unit's domain is defined based on whether or not the unit responds to a set of object instances of the management information base (MIB snmp). As soon as a new equipment unit is found, an interrogation is performed by polling a set of object instances (SNMP). When an equipment unit (ET) found responds to the interrogations of all the object instances defining a domain, the equipment is said to belong to this domain. All of the equipment units found are organized into domains. These domains make it possible to differentiate between the various types of equipment and to manage each equipment unit differently based on its domain. An equipment unit can belong to several domains.

The domain MIB2 could, for example, be defined by the response to the instance "sysUpTime0". All of the equipment units found are interrogated on this instance. Those that respond belong to at least the domain MIB2.

Finally, when the search module (MD) has found an equipment unit and its domain, it sends a notification to a model configuration module (MCM), giving it the internet protocol (IP) address of the equipment found and the domain to which this equipment belongs. Advantageously, the search module (MD) also sends this same information to the kernel (N), which stores it in a database.

Generally, when an existing system is found a second time, its domain is not searched for again. However, the domain of a system can be searched for by switching to the "on" position (ON) the instance of the management information base (MIB) related to domain searches. In this case, if the domain is not the same as the previous one, the database of the kernel is automatically updated and notifications are automatically sent to the model configuration module (MCM).

The indicator calculation module (MCI) calculates indicators on the equipment units (ET) to be managed. An indicator is an equation into which instances of objects in a management information base (MIB snmp) are inserted. The values of these object instances are obtained by polling the (snmp) agents running in each of the systems to be managed. The result of this equation is compared to a threshold value that must not be exceeded a certain number of times within a certain time interval. When the threshold value is exceeded a certain number of times within a certain time interval, an alarm is sent to the main manager (AD1).

Take for example an indicator to be instantiated on the equipment units of the domain MIB2 comprising a polling period of 60 seconds. According to the prior art, this indicator calculates the utilization of the bandwidth of a network card whose index is "1", using the equation:

$$(8*\$-(ifInOctets.1+if\ OutOctets.1)/ifSpeed.1$$

This equation will be calculated on each of the equipment units of the domain MIB2 every minute. If, in a system "A," the result exceeds the value 10 at least twice in five minutes, an alarm will be sent to the main manager (AD1). And this alarm will be perceived by the latter to have come from the system "A."

An indicator comprises simple operators such as addition (+), subtraction (−), multiplication (*), division (/) and set-oriented operators. Set-oriented operators make it possible to apply an operator to series of indicator instances. Hence, the operators:

!SUM, which produces the sum of a series of indicator instances,

!MOY, which produces an average of a series of indicators,

!MAX, which searches for the maximum value among a series of indicators,

!MIN, which searches for the minimum value among a series of indicators.

Note that the set-oriented operators are applied to systems and not to time. Moreover, an indicator can also comprise a delta operator written $- and a temporal indirection operator written &. The delta operator is defined so that, at the instant t, $-(x)=x(t)-x(t-T), where the attribute x with the value x(t-T) is collected at the instant (t-T), and where the value $-(x) gives the difference between x(t) and x(t-T). $-(x) corresponds to a delta and $t corresponds to a delta(t). The temporal indirection operator makes it possible to re-use a calculation already performed on an equipment unit. The instance calculation module (MCI) interrogates the kernel in order to initialize these operating parameters. Annex 1 gives an exemplary configuration file containing an indicator.

Thus, the search module makes it possible to define, for each IP address, the type of equipment that may be connected at this address and the domain to which this equipment unit belongs.

As a function of the domain of an equipment unit, a so-called model configuration module determines, for example by consulting a table, which equation the indicator module should use on a particular address.

The table essentially comprises the domain/identification associations of the equation.

When the management protocol is the protocol SNMP, the collection of the information, i.e. of the object instances that make it possible to evaluate an indicator, is performed by SNMP agents. An instance of an attribute of an object is identified by its name in letters and one or more indices. When there are several instances for the same attribute, they are differentiated by means of an index with a different value. The indices can be integers, character strings, IP addresses, or object identifiers For example, if a piece of equipment has two IP addresses, this information will be entered into a table by an SNMP agent, in the following form:

Instance: IpAddress.1
Type: IpAddress
Value: 129.182.165.2
and
Instance IpAddress.2
Type: IpAddress
Value: 129.182.165.3

Likewise, an attribute can have several indices of different types. Another characteristic of the SNMP management protocol is that the agents set the values of the indices in accordance with their own logic.

The object of the invention is to be able to write and evaluate an equation in which the indices of the attributes inserted into the equation are variable and undefined at the beginning of the evaluation of the equation. Thus, the preceding equation could be written:

(8*$-(ifInOctets. ?I1=ifOutOctets. ?I1)/ifSpeed. ?I1

Where, for example, the index of the attribute "ifInOctets" is replaced by "?I1", which in this case is a variable that can, a priori, assume any integer value.

This formulation thus makes it possible to interrogate, at the same IP address, with only one equation, i.e. only one indicator, all of the equipment units or applications of the same type, without knowing a priori the number and the value of the indices of the attributes of the equipment or applications to be interrogated. This formulation also makes it possible to insert constraints on the possible values of the indices. Thus, it is possible to interrogate only some of the equipment units whose index or indices satisfy the specified constraint or constraints.

In order to allow such an equation, the indicator module of the submanager according to the invention manages a particular structure, for example an array of tables. This array of tables comprises, for each IP address, the identification of the equation and all of the possible values of the indices for the evaluation of the equation, and a table storing the correspondences between the identifiers of the equations and the equations.

For example, these tables exist in the following form:

TABLE NO. 1

| IP Address | Index of the Model | Value of the Instance(s) | ... |
|---|---|---|---|
| 129.182.165.200 | 1 | I1=1 | ... |
| 129.182.165.200 | 1 | I1=3 | ... |
| 129.182.165.200 | 1 | I1=7 | ... |
| | | ... | ... |

TABLE NO. 2

| Index of the Model | Equation |
|---|---|
| 1 | DELTA(ifInErrors. ?I1+ifOutErrors. ?I1)/DELTA(ifInPackets. ?I1+ifOutPackets. ?I2) |
| 2 | ... |

In this example, the equation with the index "1" makes it possible to calculate the error rate of a network interface card. When this equation is applied, for example, to the IP address 129.182.165.200, the latter corresponds, for example, to a router. For this particular router, the index I1 has three different values (1, 3, 7) at a given instant t. This means that at this instant, the router has three interfaces, and the equation with the index "1" will be evaluated for each of these interfaces.

In this example, the choice of the equation is made in advance by the search module, which has determined that a router is connected at the IP address 129.182.165.200. This information is then transmitted by the model configuration module (MCM) to the indicator module (MCI).

When the number of interfaces varies with time in this same router, the application of the equation by the indicator module will trigger a specific procedure that makes it possible to determine what the values of the index I1 are, and hence to evaluate the equation of the indicator with the various index values possible.

Consequently, it is understood that the utilization of an equation of the type defined above makes it possible to dynamically accommodate a population of objects of the same type, even when some objects of this population appear or disappear over time.

This array of tables is also used by the indicator module to apply an equation model to a given IP address, and to update the indicators.

According to the invention, the indices of the attributes of an indicator can be of two types: integer or string. An index of the integer type is written ?In, where n makes it possible to identify an index when an attribute comprises several indices. An index of the character string type is written ?Sn.

The insertion of variable attribute indices into an equation representing an indicator involves complying with certain constraints on the indices and particularly on the number of indices. In fact, the more indices a given attribute of an equation comprises, the more memory required for the calculation of this attribute. Experience has shown that in order to obtain a process size compatible with an industrial utilization of the method according to the invention, it is desirable to limit the number of indices per attribute to 5, no matter what the index type.

Likewise, at least one so-called unifier attribute of the equation representing each indicator, must comprise all the variable indices of the equation. This constraint is set for two reasons. First of all, the unifier attribute is used during the evaluation of the equation (described below) to find all the possible instances of all the attributes of the equation. Secondly, if no such attribute exists in the equation, it means that at least two attributes of the equation are decorrelated. Consequently, the equation no longer makes sense.

The insertion of attributes with variable indices into an indicator equation also makes it possible to evaluate this equation only for given index values. In fact, by setting constraints on the values that the indices can have, it is possible to choose particular attributes for which the equation will be evaluated. For example, take the indicator that makes it possible to know the fragmentation rate of a database. According to the invention, this equation is written:

(FragmentationRate ?I1. ?I2)*1024

Where I1 represents the identification of a database and I2 represents a table in this database. If the user wants to know all the fragmentation rates of all the tables in all the databases, no constraint is necessary on the indices I1 and I2. On the other hand, if the user wants to know the fragmentation rate of all the tables in a particular database, then it is necessary to add a constraint on the index I1. This constraint has, for example, the following form:

Dbname. ?I1="database name"

Which means that the value of I1 is chosen so that the name of the database is "database name".

Figure 1:
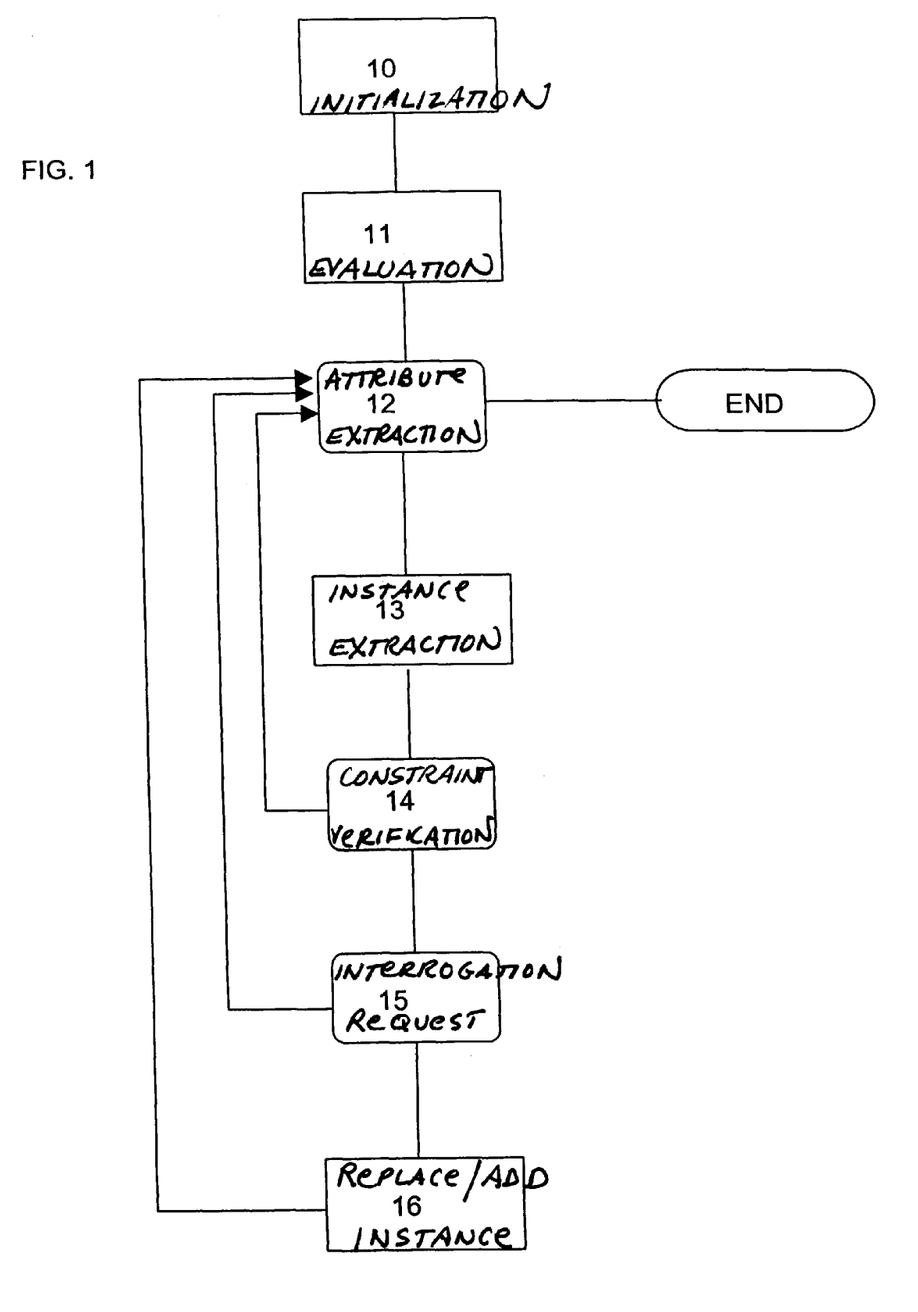
FIG. 1 represents a logic diagram of the method for implementing an indicator equation with variable indices.
Figure 2:
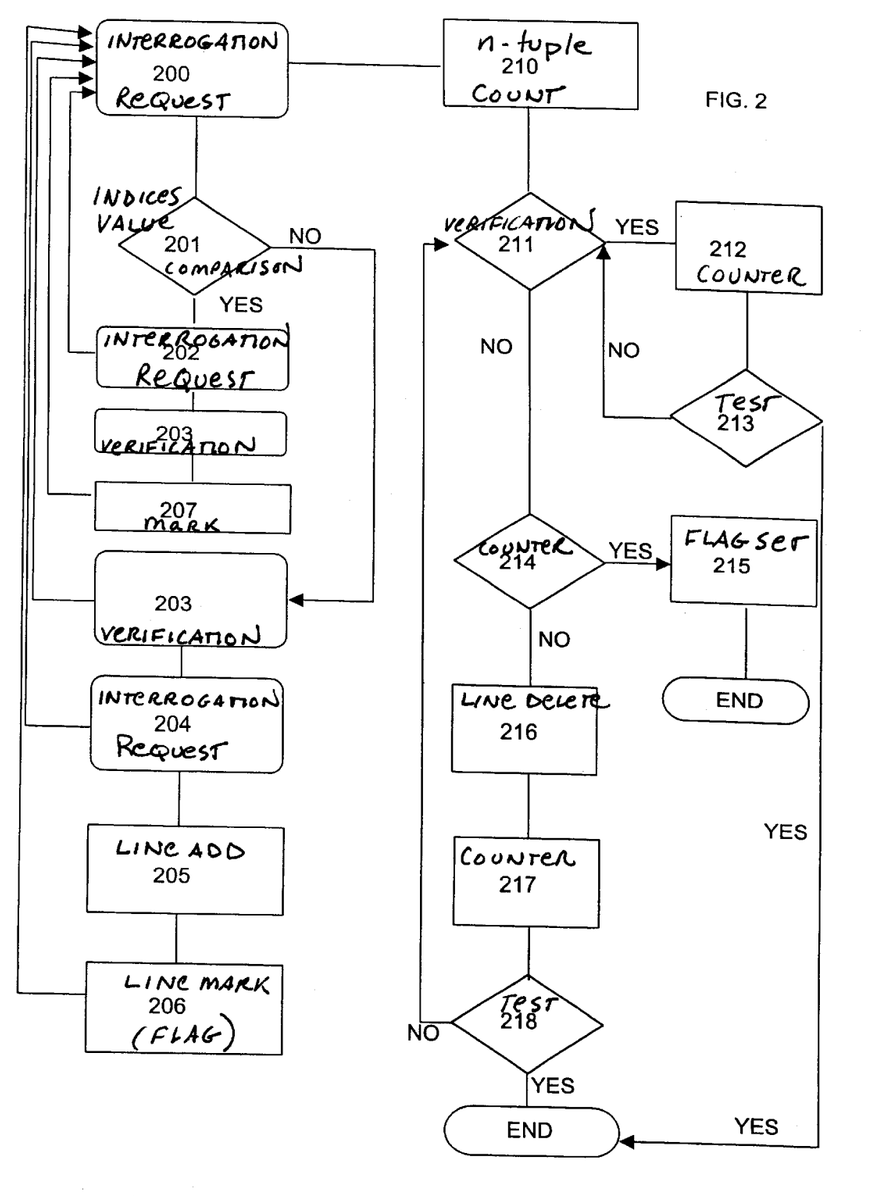
FIG. 2 represents a logic diagram of the method for updating the instances of the variable indices.

The steps of the method according to the invention will now be explained in reference to FIGS. 1 and 2. As explained above, the search module of the submanager searches for the equipment to be monitored. Next, a configuration module transmits all of the information (IP address, equation type) to the indicator module so that the latter fills in Table 1. Thus, for each equipment unit monitored, the indicator module of the submanager knows what type of equation to apply.

When the indicator module receives a piece of information from the configuration module informing it that there is a new equipment unit to be monitored, the indicator module triggers an initialization step (10). This initialization step (10) consists of filling in Table No. 1 by adding, for each index of the equation, a line containing the address of the new equipment, the index of the model of the equation and an initial value for the index. This initial value is, for example, −1 when the index is an integer, or for example an empty character string when the index is a character string.

Next, the indicator module triggers a step for evaluating the indicator at the specified address. This evaluation step (11) consists of searching for all the possible valid instances of all the indices of all the attributes of the equation, and of evaluating the equation for all the valid instances of the indices.

The search for the instances of the indices of the attributes of the equation consists, first of all, in a step (11) for searching for the unifier attribute of the equation. To this end, the indicator module (MCI, FIG. 3) comprises a procedure for analyzing the equation, which counts the number of indices for each attribute and chooses the attribute having the most indices as the unifier attribute. When several attributes have the same number of indices, the first attribute can then arbitrarily be chosen as the unifier attribute.

Likewise, another solution consists of writing the equations by choosing the first attribute encountered in the equation as the unifier attribute. In this embodiment, the step (11) for searching for the unifier attribute simply consists of extracting the index or indices of the first attribute of the equation.

Likewise, when constraints on the indices are introduced, the unifier attribute chosen is the attribute that, in addition to having the greatest number of indices, has the constraints on its indices.

In essence, in order to simplify the process of calculating the equations, all of the existing constraints on the indices of the equations are carried into the unifier attribute, which by definition comprises all of the indices.

Next, the indicator module triggers a step (12) for extracting the attributes of the equation. This step actually consists of determining the values of the indices of the attributes for which the equation is calculable. To do this, the indicator module triggers the sending, in step (12), of interrogation requests "Getnext" to the specified address, requesting the next value of the unifier attribute. When the management protocol chosen is the protocol SHMP, this interrogation is performed by means of SNMP agents.

At this stage, there are two possibilities. First, the agent returns a value that does not correspond to the unifier attribute or an error, which means that the attribute does not exist. In this case, the method for calculating the indicator is halted, but the initial value of all the indices is saved so that an update can subsequently be performed.

Secondly, the agent returns an instance for the unifier attribute, in which case the indicator module extracts, in step (13), the instances of all the indices of the unifier attribute so as to form an ordered set of values, commonly called an n-tuple of values. Then, the indicator module verifies in step (14) whether the instance or instances of the indices of the n-tuple found satisfy any constraints set for the indices. If any of the constraints are not satisfied in any of the indices, then the instances of the indices are ignored and the next value of the unifier attribute is requested.

If on the other hand, all the constraints are satisfied, then the indicator module sends, in step (15), for each other attribute of the equation, an interrogation request having as index values those of the n-tuple found previously.

If the SNMP agent returns an error-free result for all of the attribute instances requested, then the indicator module either replaces, in step (16), the index instance n-tuple in Table No. 1, if this instance corresponds to the first one found, or adds, in step (16), a line into Table No. 1, keeping the same address and the same model index, and filling in the column "value of the instance(s)" with the new value found for the index n-tuple. Then, the indicator module requests the next value of the unifier attribute.

If one of the requested attribute instances does not exist, the indicator module requests the next value of the unifier attribute without storing the value of the corresponding index n-tuple.

Then, the entire procedure is repeated until the agent responds to the request "Getnext" requesting the next value of the unifier attribute with an instance of another attribute or with an error. This means that all the instances of the unifier attribute have been found and that the search for the instances of the indices is finished.

Thus, during the subsequent evaluation of the equation, the indicator module retrieves the instances of the indices stored in Table No. 1, then interrogates the SNMP agents using as a parameter the attributes indexed with the instances found in Table No. 1. If no valid index instance is stored in Table No. 1, then the last line of the table containing a value of an index instance is marked with a flag, indicating to the indicator module that this index instance is not valid, so that the calculation of the corresponding equation is not performed.

For example, if the equation to be evaluated is the equation with the index 1 in Table No. 2, the indicator module first requests the next value of the attribute IfInErrors. If the agent returns a value for IfInErrors.1, then the indicator module interrogates the SNMP agent in order to learn the instances of the attributes ifOutErrors.1, ifInPackets.1and ifOutPackets.1. If all of these instances exist, the instance I1=1 is stored in Table No. 1, then the next value of the attribute IfInErrors is requested. If any of these instances do not exist, the subsequent value of the attribute IfInErrors is requested.

The procedure is repeated until the agent responds to the request requesting the instance of IfInErrors with an erroneous value, for example corresponding to another attribute. In our example, the indicator module has found a total of three instances for the index I1, i.e. 1, 3 and 7.

In order to keep track of the evolution of the domain monitored by the submanager according to the invention, a step for updating the instances is performed, for example periodically. Thus, according to the invention, the evolution of the sub-domain, and in particular the evolution of the equipment units themselves, is taken into account dynamically by the indicator module.

This updating step consists of verifying that the instances of the valid index n-tuples stored in Table No. 1 are still valid, and of verifying that no other index instances exist. The step for checking for the existence of new index instances is performed by the indicator module, which sends in step (200, FIG. 2) an interrogation request in order to request the first instance of the unifier attribute of the equation. As soon as the SNMP agent interrogated returns an instance of the unifier attribute, the indicator module extracts the value of the indices found and compares them in step (201) to the instances of the index n-tuples stored in Table No. 1. If the instances found correspond to an n-tuple already stored, the indicator module sends, in step (202), for each other attribute of the equation, an interrogation request having as index values those of the n-tuple found. If the SNMP agent returns an error-free result for all of the attribute instances requested, the indicator module verifies, in step (203), whether the constraints on the indices, if there are any, are satisfied. If the constraints are satisfied, the indicator module, in step (207), marks the line with a flag indicating that this index instance has been found. After this operation in the marking step (207), if during the sending in step (202) of the interrogation request having as index values those of the n-tuple previously found, any of the instances is not returned, the next instance of the unifier attribute is requested in step (200). If the constraints on the indices are not satisfied, step 207 is skipped and the next instance of the unifier attribute is requested.

If during the comparison the indicator module does not find in Table 1 the index n-tuple returned by the SNMP agent, the indicator module verifies in step (203) whether the constraints on the indices, if there are any, are satisfied. If these constraints are satisfied, the indicator module sends, in step (204), for each other attribute of the equation, an interrogation request having as index values those of the n-tuple previously found. If any of the constraints are not satisfied, the value of the n-tuple is ignored and the next value of the unifier attribute is requested in step (200).

If the SNMP agent returns an error-free result for all of the attribute instances requested, then the indicator module, in step (205), adds a line to Table No. 1, in which the new instance of the index n-tuple is stored. Next, the indicator module, in step (206), marks this new line with a flag before requesting, in step (200), the next instance of the unifier attribute. If during the sending in step (204) of the interrogation request having as index values those of the n-tuple previously found, one of the instances is not returned, the index n-tuple is ignored.

The entire procedure described above is repeated until the agent responds to the request "Getnext" for requesting the next value of the unifier attribute with an instance of another attribute or with an error. This means that all the instances of the unifier attribute have been found.

The indicator module then verifies the validity of the index instance n-tuples in Table No. 1. To do this, the indicator module first counts, in step (210), the number of n-tuples found in Table No. 1 for a given IP address and equation, initializes in step (210) a first counter with the number of lines found, and initializes in step (210) a second counter with zero. Next, in a verification step in step (211), the indicator module verifies, for each line comprising the given IP address and equation, whether a flag is present. If a flag is present for the current line, the first counter is decremented (212) by 1. A test step (213) makes it possible to verify the value of the first counter. If the first counter is equal to zero, the procedure is finished; otherwise the next line is processed.

If there is no flag for a line, the second counter is incremented by 1 in step (214) then compared in step (214) to the number of lines determined previously. If they are equal, the line is not deleted since it is in fact the last line for this address and this equation. However, in order to invalidate the information contained in this line so that it is not used in a subsequent evaluation of the equation, the indicator module, in step (215) sets a flag indicating that the attribute instance n-tuple is not valid. Furthermore, since this is the last line, the verification step is finished.

If the value of the second counter is different from the number of lines, the current line is deleted in step (216). Then, the first counter is decremented by 1 in step (217). A test step in step (218) makes it possible to verify the value of the first counter. If the first counter is equal to zero, the verification step is finished; otherwise the next line is processed in the same way.

The choice to save a line, even an invalid one, in Table No. 1 makes it possible to subsequently perform a new update on this IP address and this equation, thereby keeping track of the appearance or disappearance of equipment units or applications at this IP address.

As explained above, an update is performed periodically in order to dynamically keep track of the evolution of the domain to be monitored. In a variant of embodiment, the time period applied for the updates is longer. Thus, several evaluations of an equation can occur between two updates. In addition, the update period can be offset relative to the evaluation period for the corresponding equation so that an update does not occur at the same time as an evaluation, so as not to overload the network, not to use an invalid index instance and not to produce simultaneous read and write accesses in Table No. 1.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

ANNEX 1

```
# SECTION describing the indicators

# type: IND|FIL respectively INDicator or FILter
# Id: indicator index (generated automatically)
# Name: name of the indicator
# Domain: grouping of managed systems found by their
   addresses into domains identifiable by 5 get requests sent
   by COACH
# Equation: equation of the indicator
# T polling: polling or indicator construction period
# Threshold: decision threshold for the sending of a trap
# Appearance: number of appearances of the threshold value
   after which a trap is sent
# Period: period in which the x threshold values appear
# Comparison direction: direction of comparison between
   the threshold and the result
# Log: indicates whether or not the indicator should be
   logged
$
# Format of the description line
# |type|Id|Name|Domain|Equation|T polling|threshold|x
   times|in T seconds|test direction|log

#AXA/COACH/internet/indicators
# The indicator examples presented below are given in the
   form of the prior art. According to the invention, any of
   the attribute indices could be replaced by a variable index
   written ?In or ?Sn
# % of bandwidth utilization in the interface
IND 1 ifUtilizationBandWidth 2(((8* $(ifInOctets.1+
   ifOutOctets.1))/$t)/ifSpeed.1)*100 600 10 1 1200>LOG
# % of bandwidth utilization in the segment
IND 2 ifUtilizationBandWidthAll 3|SUM
   (ifUtilizationBandWidth) 1210 10 1 3 3600>LOG
# Discard rate of incoming and outgoing packets in the
   segment
IND 3 ifDiscards 2 $-(ifInDiscards.1+ifOutDiscards.1) 120
   1 1 120>LOG
# Sum of the discard rates of incoming and outgoing packets
   in the segment
IND 4ifDiscardsAll 3|SUM(ifDiscards) 320 3 1 320>LOG
# Length of the outgoing packet queue in the interface
IND 5 coachIfOutQlen 2 ifOutQLen.1 330 5 1 330>LOG
# Sum of the lengths of the outgoing packet queues in all the
   interfaces of the segment
IND 6 coachIfOutQLenAll 3|SUM(coachIfOutQLen) 670
   50 1 670>LOG
# Number of packets retransmitted through the interface
IND 7 coachcpRetransSegs 2 tcpRetransSegs. 0 340 5 1
   340>LOG
# Error rate in the interface
IND 8 ifErrors 2 ($(ifInErrors.1+ifOutErrors.1)$t) 290 5 1
   290>LOG
# Error rate in the segment
IND 9 ifErrorsSUM 3 !SUM(ifErrors) 620 2 1 620>LOG
# Average error rate in all the interfaces of the segment
IND 10 ifErrorsMOY 3 (!MOY(ifErrors)*100) 630 5 1
   630>LOG
# Incoming and outgoing unicast rate in the interface
IND 11 ifUcastPackets 2 (ifInUcastPkts.1+
   ifOutUcastPkts.1)$t 280 5 1 280>LOG
# Incoming and outgoing multicast rate in the interface
IND 12 ifNUPackets 2 (ifInNUcastPkts.1+
   ifOutNUcastPkts.1)$t280 5 1 280>NLOG
# % of errors in the interface relative to the total packets sent
   or received
IND 13 ifErrorsRatio 2 (&ifErrors/(&ifInPackets+
   &ifOutPackets))*100 570 5 1570>NLOG
# average % in the segment of the errors in all the interfaces
   of the segment
IND 14 ifErrorsRatioLinkMOY 3 !MOY(ifErrorsRatio)
   1220 5 1 1220>LOG
# % Sum of the error ratios in all the interfaces of the links
IND 15 IfErrorsRatioLinkSUM 3 !SUM(ifErrorsRatio)
   1220 20 1 1220>LOG
# Quantity of header and address errors in the interface. Use
   to calculate ipInputErrorsPercent
IND 16 ipInputErrors 2$-(ipInHdrErrors.0+
   ipInAddrErrors.0) 650 5 1 650>LOG
# % of header and address errors in the interface
IND 17 ipInputErrorsPercent 2 (&ipInputErrors/($-
   (ipInDelivers.0)))*100 650 5 1 650>LOG
# Sum of the percentages of header and address errors in the
   interface
IND 18 ipInputErrorsPercentOnLink 3 !SUM
   (ipInputErrorsPercent) 300 5 1 300>LOG
# Unavailability of a machine
IND 19 NoAvailability 2-$t/($-(sysUpTime.0)) 100 1 1
   300>LOG
# Sum of the unavailability of all the machines of the
   segment
IND 20 NoAvailabilityOnLink 3 !SUM(NoAvailability) 150
   100 1 300>LOG
# 21/10/97 20:17 file: CONFMOD.DOC#version DRAFT
```

What is claimed is:

1. A method for calculating an indicator of a network management system having at least one submanager that monitors a part of the network, the submanager comprising a plurality of modules that allow communication with equipment units of the network and with a main manager, the method for calculation being characterized in that at least one equation defining an indicator and evaluated by an indicator module of the submanager comprises at least one object attribute, at least one index whereof is variable, and a step for transmitting a notification by a model configuration module, a step for receiving the transmitted notification by an indicator module comprising an address of an equipment unit and an identification of an equation representing an indicator, an initialization step in which the instances of the variable indices have an initial value that does not make it possible to calculate the specified equation, and a step for determining all the valid instances of all the variable indices of all the attributes of the equation.

2. A method for calculating an indicator according to claim 1, characterized in that the step for determination comprises:

a step for searching, in the equation, for a unifier attribute comprising the largest number of variable indices, a step for sending an interrogation request, successively requesting the various instances of the unifier attribute, a step for extracting the instances of each variable index of the unifier attribute, a step for sending an interrogation request requesting the instances of the attributes of the equation having as variable index values the values extracted in the step for extracting, and a step for storing the variable index instances for which an instance has been found for all of the attributes of the equation.

3. A method for calculating an indicator according to claim 1, characterized in that the definition of the indices in the equation comprises constraints limiting the number of instances possible for at least one variable index.

4. A method for calculating an indicator according to claim 2, characterized in that the definition of the indices in the equation comprises constraints limiting the number of instances possible for at least one variable index.

5. A method for calculating an indicator according to claim 2, further comprising a verification step that makes it possible to verify whether the instances of the extracted indices of the unifier attribute satisfy the specified constraints.

6. A method for calculating an indicator according to claim 1, characterized in that the method comprises a step for updating the instances of the indices, performed periodically.

7. A method for calculating an indicator according to claim 2, characterized in that the method comprises a step for updating the instances of the indices, performed periodically.

8. A method for calculating an indicator according to claim 3, characterized in that the method comprises a step for updating the instances of the indices, performed periodically.

9. A method for calculating an indicator according to claim 4, characterized in that the method comprises a step for updating the instances of the indices, performed periodically.

10. A method for calculating an indicator according to claim 5, characterized in that the method comprises a step for updating the instances of the indices, performed periodically.

11. A method for calculating an indicator according to claim 6, characterized in that the updating step comprises:
    a step for sending an interrogation request, successively requesting the next instance of the unifier attribute,
    a step for comparing the index instances found with the previous index instances,
    a step for verifying the validity of the index instances found that correspond to previous index instances, and the index instances found that do not correspond to previous index instances,
    a step for deleting the previous index instances that were not found or that are no longer valid, and
    a step for adding the index instances found and validated.

12. A method for calculating an indicator according to claim 1, characterized in that the updating step comprises:
    a step for sending an interrogation request, successively requesting the next instance of the unifier attribute,
    a step for comparing the index instances found with the previous index instances,
    a step for verifying the validity of the index instances found that correspond to previous index instances, and the index instances found that do not correspond to previous index instances,
    a step for deleting the previous index instances that were not found or that are no longer valid, and
    a step for adding the index instances found and validated.

13. A method for calculating an indicator according to claim 2, characterized in that the updating step comprises:
    a step for sending an interrogation request, successively requesting the next instance of the unifier attribute,
    a step for comparing the index instances found with the previous index instances,
    a step for verifying the validity of the index instances found that correspond to previous index instances, and the index instances found that do not correspond to previous index instances,
    a step for deleting the previous index instances that were not found or that are no longer valid, and
    a step for adding the index instances found and validated.

14. A method for calculating an indicator according to claim 3, characterized in that the updating step comprises:
    a step for sending an interrogation request, successively requesting the next instance of the unifier attribute,
    a step for comparing the index instances found with the previous index instances,
    a step for verifying the validity of the index instances found that correspond to previous index instances, and the index instances found that do not correspond to previous index instances,
    a step for deleting the previous index instances that were not found or that are no longer valid, and
    a step for adding the index instances found and validated.

15. A method for calculating an indicator according to claim 4, characterized in that the updating step comprises:
    a step for sending an interrogation request, successively requesting the next instance of the unifier attribute,
    a step for comparing the index instances found with the previous index instances,
    a step for verifying the validity of the index instances found that correspond to previous index instances, and the index instances found that do not correspond to previous index instances,
    a step for deleting the previous index instances that were not found or that are no longer valid, and
    a step for adding the index instances found and validated.

16. A method for calculating an indicator according to claim 5, characterized in that the updating step comprises:
    a step for sending an interrogation request, successively requesting the next instance of the unifier attribute,
    a step for comparing the index instances found with the previous index instances,
    a step for verifying the validity of the index instances found that correspond to previous index instances, and the index instances found that do not correspond to previous index instances,
    a step for deleting the previous index instances that were not found or that are no longer valid, and
    a step for adding the index instances found and validated.

17. A method for calculating an indicator according to claim 7, characterized in that the updating step comprises:
    a step for sending an interrogation request, successively requesting the next instance of the unifier attribute,
    a step for comparing the index instances found with the previous index instances,
    a step for verifying the validity of the index instances found that correspond to previous index instances, and the index instances found that do not correspond to previous index instances,
    a step for deleting the previous index instances that were not found or that are no longer valid, and
    a step for adding the index instances found and validated.

18. A method for calculating an indicator according to claim 11, characterized in that the step for validating the instances comprises a step for sending an interrogation request requesting the instances of the attributes of the equation having as variable index values the instances found in the preceding step.

19. A method for calculating an indicator according to claim 12, characterized in that the step for validating the instances comprises a step for sending an interrogation request requesting the instances of the attributes of the equation having as variable index values the instances found in the preceding step.

20. A method for calculating an indicator according to claim 13, characterized in that the step for validating the instances comprises a step for sending an interrogation request requesting the instances of the attributes of the equation having as variable index values the instances found in the preceding step.

21. A method for calculating an indicator according to claim 14, characterized in that the step for validating the instances comprises a step for sending an interrogation request requesting the instances of the attributes of the equation having as variable index values the instances found in the preceding step.

22. A method for calculating an indicator according to claim 15, characterized in that the step for validating the instances comprises a step for sending an interrogation request requesting the instances of the attributes of the equation having as variable index values the instances found in the preceding step.

23. A method for calculating an indicator according to claim 16, characterized in that the step for validating the instances comprises a step for sending an interrogation request requesting the instances of the attributes of the equation having as variable index values the instances found in the preceding step.

24. A method for calculating an indicator according to claim 17, characterized in that the step for validating the instances comprises a step for sending an interrogation request requesting the instances of the attributes of the equation having as variable index values the instances found in the preceding step.

25. A method for calculating an indicator according to claim 11, characterized in that the step for deleting the previous index instances that were not found or that are no longer valid comprises:
- a step for marking the index instances validated during the validity verification step,
- a step for counting the total number of index instances, and
- a step for deleting all of the unmarked index instances, except one.

26. A method for calculating an indicator according to claim 12, characterized in that the step for deleting the previous index instances that were not found or that are no longer valid comprises:
- a step for marking the index instances validated during the validity verification step,
- a step for counting the total number of index instances, and
- a step for deleting all of the unmarked index instances, except one.

27. A method for calculating an indicator according to claim 13, characterized in that the step for deleting the previous index instances that were not found or that are no longer valid comprises:
- a step for marking the index instances validated during the validity verification step,
- a step for counting the total number of index instances, and
- a step for deleting all of the unmarked index instances, except one.

28. A method for calculating an indicator according to claim 14, characterized in that the step for deleting the previous index instances that were not found or that are no longer valid comprises:
- a step for marking the index instances validated during the validity verification step,
- a step for counting the total number of index instances, and
- a step for deleting all of the unmarked index instances, except one.

29. A method for calculating an indicator according to claim 15, characterized in that the step for deleting the previous index instances that were not found or that are no longer valid comprises:
- a step for marking the index instances validated during the validity verification step,
- a step for counting the total number of index instances, and
- a step for deleting all of the unmarked index instances, except one.

30. A method for calculating an indicator according to claim 16, characterized in that the step for deleting the previous index instances that were not found or that are no longer valid comprises:
- a step for marking the index instances validated during the validity verification step,
- a step for counting the total number of index instances, and
- a step for deleting all of the unmarked index instances, except one.

31. A method for calculating an indicator according to claim 17, characterized in that the step for deleting the previous index instances that were not found or that are no longer valid comprises:
- a step for marking the index instances validated during the validity verification step,
- a step for counting the total number of index instances, and
- a step for deleting all of the unmarked index instances, except one.

32. A method for calculating an indicator according to claim 18, characterized in that the step for deleting the previous index instances that were not found or that are no longer valid comprises:
- a step for marking the index instances validated during the validity verification step,
- a step for counting the total number of index instances, and
- a step for deleting all of the unmarked index instances, except one.

33. A method calculating an indicator according to claim 19, characterized in that the step for deleting the previous index instances that were not found or that are no longer valid comprises:
- a step for marking the index instances validated during the validity verification step,
- a step for counting the total number of index instances, and
- a step for deleting all of the unmarked index instances, except one.

34. A method for calculating an indicator according to claim 20, characterized in that the step for deleting the previous index instances that were not found or that are no longer valid comprises:

a step for marking the index instances validated during the validity verification step, a step for counting the total number of index instances, and a step for deleting all of the unmarked index instances, except one.

35. A method for calculating an indicator according to claim 21, characterized in that the step for deleting the previous index instances that were not found or that are no longer valid comprises:

a step for marking the index instances validated during the validity verification step, a step for counting the total number of index instances, and a step for deleting all of the unmarked index instances, except one.

36. A method for calculating an indicator according to claim 22, characterized in that the step for deleting the previous index instances that were not found or that are no longer valid comprises:

a step for marking the index instances validated during the validity verification step, a step for counting the total number of index instances, and a step for deleting all of the unmarked index instances, except one.

37. A method for calculating an indicator according to claim 23, characterized in that the step for deleting the previous index instances that were not found or that are no longer valid comprises:

a step for marking the index instances validated during the validity verification step, a step for counting the total number of index instances, and a step for deleting all of the unmarked index instances, except one.

38. A method for calculating an indicator according to claim 24, characterized in that the step for deleting the previous index instances that were not found or that are no longer valid comprises:

a step for marking the index instances validated during the validity verification step, a step for counting the total number of index instances, and a step for deleting all of the unmarked index instances, except one.

* * * * *